(12) United States Patent
Ishida et al.

(10) Patent No.: US 10,868,924 B2
(45) Date of Patent: Dec. 15, 2020

(54) INFORMATION PROCESSING APPARATUS AND IMAGE FORMING APPARATUS

(71) Applicants: Takahiro Ishida, Tokyo (JP); Makoto Sugino, Kanagawa (JP); Masaki Nakamura, Osaka (JP)

(72) Inventors: Takahiro Ishida, Tokyo (JP); Makoto Sugino, Kanagawa (JP); Masaki Nakamura, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 91 days.

(21) Appl. No.: 16/351,804

(22) Filed: Mar. 13, 2019

(65) Prior Publication Data

US 2019/0306340 A1 Oct. 3, 2019

(30) Foreign Application Priority Data

Mar. 29, 2018 (JP) ................ 2018-064061

(51) Int. Cl.
*H04N 1/00* (2006.01)
*G06F 3/12* (2006.01)

(52) U.S. Cl.
CPC ..... *H04N 1/00339* (2013.01); *H04N 1/00037* (2013.01); *H04N 1/00965* (2013.01)

(58) Field of Classification Search
None
See application file for complete search history.

(56) References Cited

U.S. PATENT DOCUMENTS

| 4,709,136 A | * | 11/1987 | Watanabe | G06Q 20/341 235/379 |
| 5,838,887 A | * | 11/1998 | Murakami | G06K 15/00 358/1.13 |
| 2002/0031280 A1 | * | 3/2002 | Sheng | H04N 1/00241 382/305 |
| 2002/0179707 A1 | * | 12/2002 | Omet | G06K 7/0013 235/451 |
| 2006/0208097 A1 | * | 9/2006 | Ando | G06F 1/3203 235/492 |
| 2007/0134988 A1 | * | 6/2007 | Ito | G06K 7/0013 439/630 |

FOREIGN PATENT DOCUMENTS

| JP | 2003-216347 | 7/2003 |
| JP | 2006-146467 | 6/2006 |
| JP | 2011-253373 | 12/2011 |
| JP | 2014-179929 | 9/2014 |
| JP | 2015-177453 | 10/2015 |

\* cited by examiner

*Primary Examiner* — Dov Popovici
(74) *Attorney, Agent, or Firm* — Harness, Dickey & Pierce, P.L.C.

(57) ABSTRACT

An information processing apparatus includes an interface for a medium, which includes a mechanical switch, and circuitry. The circuitry is configured to: detect insertion of the medium into the interface; determine whether the insertion of the medium is for inputting data into the information processing apparatus; detect a state of the mechanical switch of the medium inserted, in response to determination that the insertion of the medium is for inputting data; generate numerical data according to the state; receive, as input data, the numerical data generated; and execute an operation according to the input data.

19 Claims, 6 Drawing Sheets

| INPUT DATA | CHARACTER |
|---|---|
| ... | ... |
| ... | ... |
| 01000100 | D |
| ... | ... |
| 01001101 | M |
| ... | ... |
| 01010000 | P |
| ... | ... |
| 01010101 | U |
| ... | ... |
| ... | ... |

FIG. 6

| CHARACTER STRING | WHAT TO EXECUTE |
|---|---|
| DUMP | DUMP MEMORY |
| SAVE | SAVE DEVICE INFORMATION |
| ... | ... |
| ... | ... |

INFORMATION PROCESSING APPARATUS AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2018-064061, filed on Mar. 29, 2018, in the Japan Patent Office, the entire disclosure of which is hereby incorporated by reference herein.

BACKGROUND

Technical Field

Embodiments of the present disclosure relate to an information processing apparatus and an image forming apparatus.

Related Art

Information processing apparatuses such as specific-purpose embedded devices are often provided with a component usable as a user interface, such as a switch, allowing a user to instruct the apparatuses to execute a given operation.

In order to prevent an increase in production cost and downsize the apparatuses, some information apparatuses may have a user interface aboard to execute an operation desired by a user.

SUMMARY

In one embodiment of the present disclosure, a novel information processing apparatus that includes an interface for a medium, which includes a mechanical switch, and circuitry. The circuitry is configured to: detect insertion of the medium into the interface; determine whether the insertion of the medium is for inputting data into the information processing apparatus; detect a state of the mechanical switch of the medium inserted, in response to determination that the insertion of the medium is for inputting data; generate numerical data according to the state; receive, as input data, the numerical data generated; and execute an operation according to the input data.

Also described is a novel image forming apparatus.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

Figure 1A:
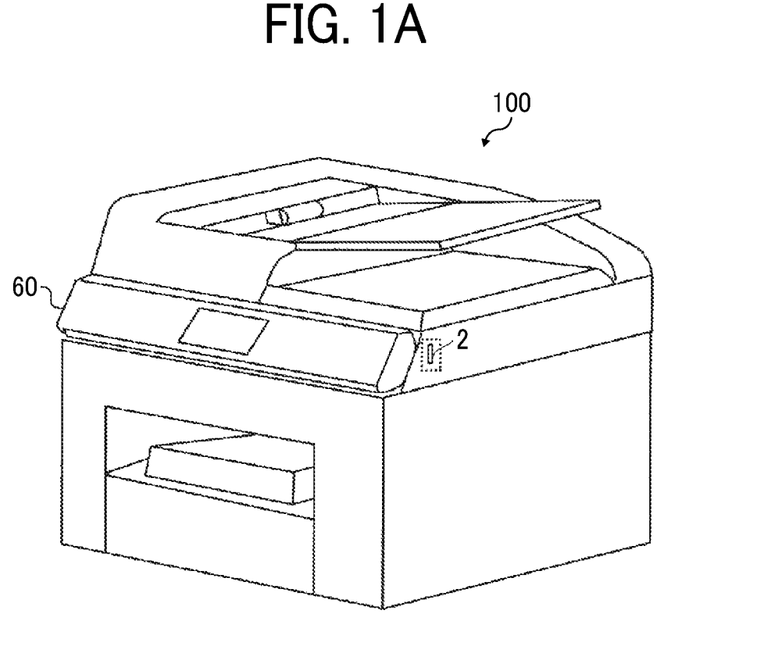
FIG. 1A is an external view of an image forming apparatus according to a first embodiment of the present disclosure.
Figure 1B:
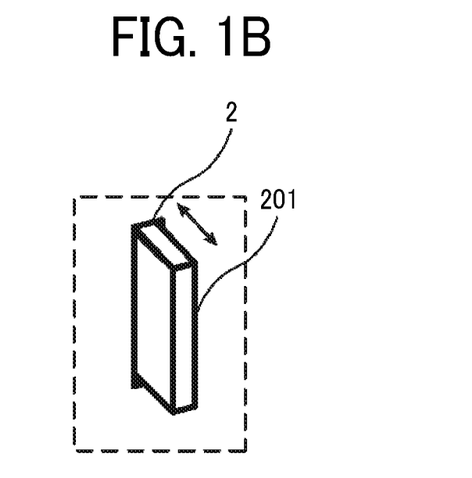
FIG. 1B is a partial enlarged view of the image forming apparatus.

Initially with reference to FIGS. 1A and 1B, a description is given of an image forming apparatus according to a first embodiment of the present disclosure.

FIG. 1A is an external view of an image forming apparatus 100 according to the first embodiment of the present disclosure.

The image forming apparatus 100 may be a copier, a facsimile machine, a printer, a multifunction peripheral (MFP) having at least two of copying, printing, scanning, facsimile, and plotter functions, or the like. In the present embodiment, the image forming apparatus 100 is an information processing apparatus that processes information input from an external device or through an operation device 60 and prints an image on a recording medium such as a paper sheet according to the processed information. The image forming apparatus 100 includes a medium port 2.

FIG. 1B is an enlarged view of a broken-line portion of the image forming apparatus 100 illustrated in FIG. 1A.

As illustrated in FIG. 1B, the medium port 2 is an opening through which, e.g., a user inserts a medium 201 into the image forming apparatus 100. The medium port 2 guides the medium 201 into a medium slot 70, which is an external interface. A description of the medium slot 70 is deferred. The medium 201 is inserted into and removed from the medium slot 70 through the medium port 2 in directions indicated by a two-way arrow in FIG. 1B.

Figure 2A:
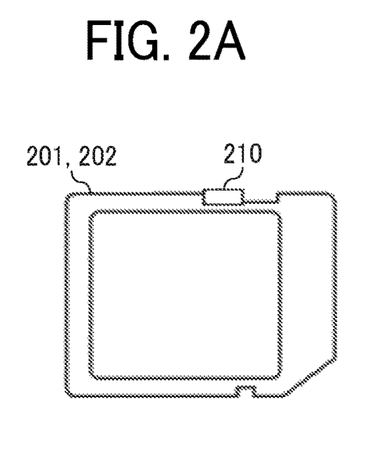
FIG. 2A is an external view of a medium according to the first embodiment of the present disclosure.
Figure 2B:
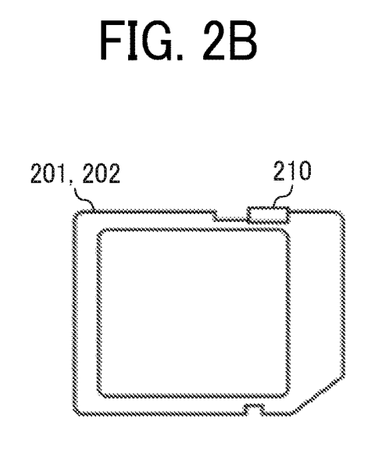
FIG. 2B is another external view of the medium.

Referring now to FIGS. 2A and 2B, a description is given of a configuration of the medium 201 described above.

FIG. 2A is an external view of the medium 201 according to the first embodiment of the present disclosure. FIG. 2B is another external view of the medium 201.

The medium 201 of the present embodiment includes a mechanical switch 210 as illustrated in FIGS. 2A and 2B. Examples of the medium 201 with the mechanical switch 210 include a secure digital (SD) card and a floppy disk (registered trademark) including a mechanical switch as a write protect switch for changing the medium 201 between two kinds of states, that is, a writable state and a non-writable state.

FIGS. 2A and 2B illustrate the identical medium 201 including the mechanical switch 210. As illustrated in FIGS. 2A and 2B, the mechanical switch 210 is movable with respect to a main body of the medium 201. Specifically, e.g., a user slides the mechanical switch 210 in a lateral direction of FIGS. 2A and 2B to position the mechanical switch 210 as illustrated in FIG. 2A or 2B.

Now, a detailed description is given of the mechanical switch 210 as a write protect switch, for example.

The medium 201 is in a state of "write protect ON" when the mechanical switch 210 is positioned as illustrated in FIG. 2A or 2B. In the present example, when the mechanical switch 210 is positioned left as illustrated in FIG. 2A, the mechanical switch 210 is in the state of "write protect ON". That is, the medium 201 is in the non-writable state. On the other hand, when the mechanical switch 210 is positioned right as illustrated in FIG. 2B, the mechanical switch 210 is in a state of "write protect OFF". That is, the medium 201 is in the writable state.

Note that, since the medium 201 according to the first embodiment and a medium 202 according to a second embodiment described later have identical appearances with the mechanical switch 210, FIGS. 2A and 2B illustrate reference numerals 201 and 202 side by side.

Figure 3:
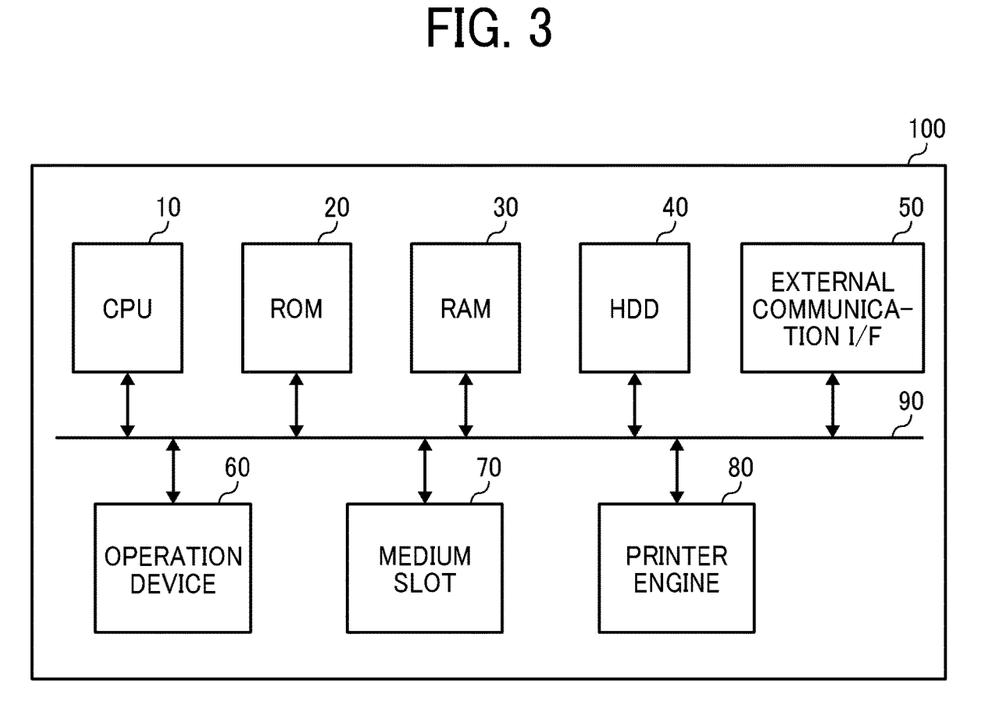
FIG. 3 is a block diagram illustrating a hardware configuration of the image forming apparatus according to the first embodiment of the present disclosure.

Referring now to FIG. 3, a description is given of a hardware configuration of the image forming apparatus 100 described above.

FIG. 3 is a block diagram illustrating the hardware configuration of the image forming apparatus 100 according to the first embodiment of the present disclosure.

The image forming apparatus 100 has the following configuration to function as an information processing apparatus that receives and processes various types of information.

As illustrated in FIG. 3, the image forming apparatus 100 includes a central processing unit (CPU) 10, a read only memory (ROM) 20, a random access memory (RAM) 30, a hard disk drive (HDD) 40, an external communication interface (I/F) 50, the operation device 60, the medium slot 70, and a printer engine 80, which interconnect via a system bus 90.

The CPU 10 controls the operation of the image forming apparatus 100. Specifically, the CPU 10 executes programs stored in the ROM 20 or the HDD 40 with the RAM 30 as a work area, thereby controlling the operation of the image forming apparatus 100 as a whole to implement various functions.

The ROM 20 is a nonvolatile semiconductor memory that is capable of retaining data even after the power is turned off.

The RAM 30 is a volatile semiconductor memory that temporarily stores programs and data. Note that the ROM 20 and the RAM 30 may be collectively referred to as a memory unit.

The HDD 40 is a nonvolatile storage device that stores programs and data. Examples of the programs stored in the HDD 40 include an operating system (OS), as basic software for controlling the operation of the image forming apparatus 100 as a whole, and application programs that function on the OS. Examples of the data stored in the HDD 40 include various setting values that are used to implement various functions such as the copying, scanning, facsimile, and printing functions. The HDD 40 is also capable of storing an operation executed by the image forming apparatus 100. Hereinafter, the operation executed by the image forming apparatus 100 may be occasionally referred to as a print job. In addition, the HDD 40 may store various types of information such as user information managed by functions of a database and a file system.

The external communication I/F 50 is an interface that connects the image forming apparatus 100 to a network such as the Internet and a local area network (LAN). The image forming apparatus 100 receives a print instruction, image data, and the like from an external device via the external communication I/F 50.

The operation device 60 receives various inputs according to operations by, e.g., a user on one hand. For example, the operation device 60 receives a request for setting and execution of a print job and a request for execution of a maintenance operation. On the other hand, the operation device 60 displays various types of information. For example, the operation device 60 displays information indicating an operation received, information indicating an operation status of the image forming apparatus 100, and information indicating a current configuration of the image forming apparatus 100. The operation device 60 includes, but not limited to, e.g., a hardware key and a display with which, e.g., a user inputs information, and a lamp that notifies the user of, e.g., a status of the image forming apparatus 100 and a processing result. In addition to or in place of such components, the operation device 60 may include a liquid crystal display (LCD) having a touch panel function, or an organic electroluminescence (OEL) having a touch panel function. The operation device 60 is controlled by the CPU 10.

The medium slot 70 is an interface for the medium 201, which is a storage medium including the mechanical switch 210. A user, for example, inserts the medium 201 into the medium slot 70 through the medium port 2. Then, the CPU 10 causes the medium slot 70 to write or read data to and from the medium 201 inserted. The CPU 10 also causes the medium slot 70 to recognize the position of the mechanical switch 210 to write or not to write data to the medium 201. For example, when the mechanical switch is positioned to protect writing to the medium 201, the medium slot 70 does not write data to the medium 201.

When the medium 201 is inserted into the medium slot 70, the CPU 10 detects, as a hardware interrupt, the insertion of the medium 201 and the state of the mechanical switch 210 of the medium 201. When the OS is executed, the OS recognizes the medium 201 inserted.

Specifically, the CPU 10 detects a signal output from a switch pressed by the medium 201 inserted, thereby detecting the insertion of the medium 201. Alternatively, the CPU 10 may detect a contact between a terminal of the medium 201 and the medium slot 70.

The medium slot 70 may be provided with a switch that is pressed when the mechanical switch 210 is positioned as illustrated in FIG. 2A or 2B. With the switch, the CPU 10 detects the state of the mechanical switch 210, for example. Thus, the image forming apparatus 100 detects the state of the mechanical switch 210 each time when the medium 201 is inserted into the medium slot 70.

The printer engine 80 is an image forming device that implements the printing function. In addition to the printing function, the printer engine 80 may implement, e.g., the scanning, copying and facsimile functions. That is, the printer engine 80 controls, e.g., a printer, a copier, a facsimile, and a scanner to execute printing and scanning operations. The image forming apparatus 100 may employ e.g., an electrophotographic method or an inkjet method to implement the printing function. Alternatively, the image forming apparatus 100 may employ another method to implement the printing function. The printer engine 80 may include specific optional devices such as a finisher that sorts printed sheets and an automatic document feeder (ADF) that automatically feeds a document. The printer engine 80 is controlled by the CPU 10.

Note that the programs stored in the ROM 20 or the HDD 40 are processable by a computer. The programs may be installed in the ROM 20 or the HDD 40 at the time of manufacturing or shipping of the image forming apparatus 100. Alternatively, the programs may be installed in the ROM 20 or the HDD 40 after the sale of the image forming apparatus 100. In this case, the programs may be installed in the ROM 20 or the HDD 40 via an external storage medium drive from an external storage medium storing the programs or program code. Alternatively, the programs may be installed in the ROM 20 or the HDD 40 via the network, with the external communication I/F 50.

Figure 4:
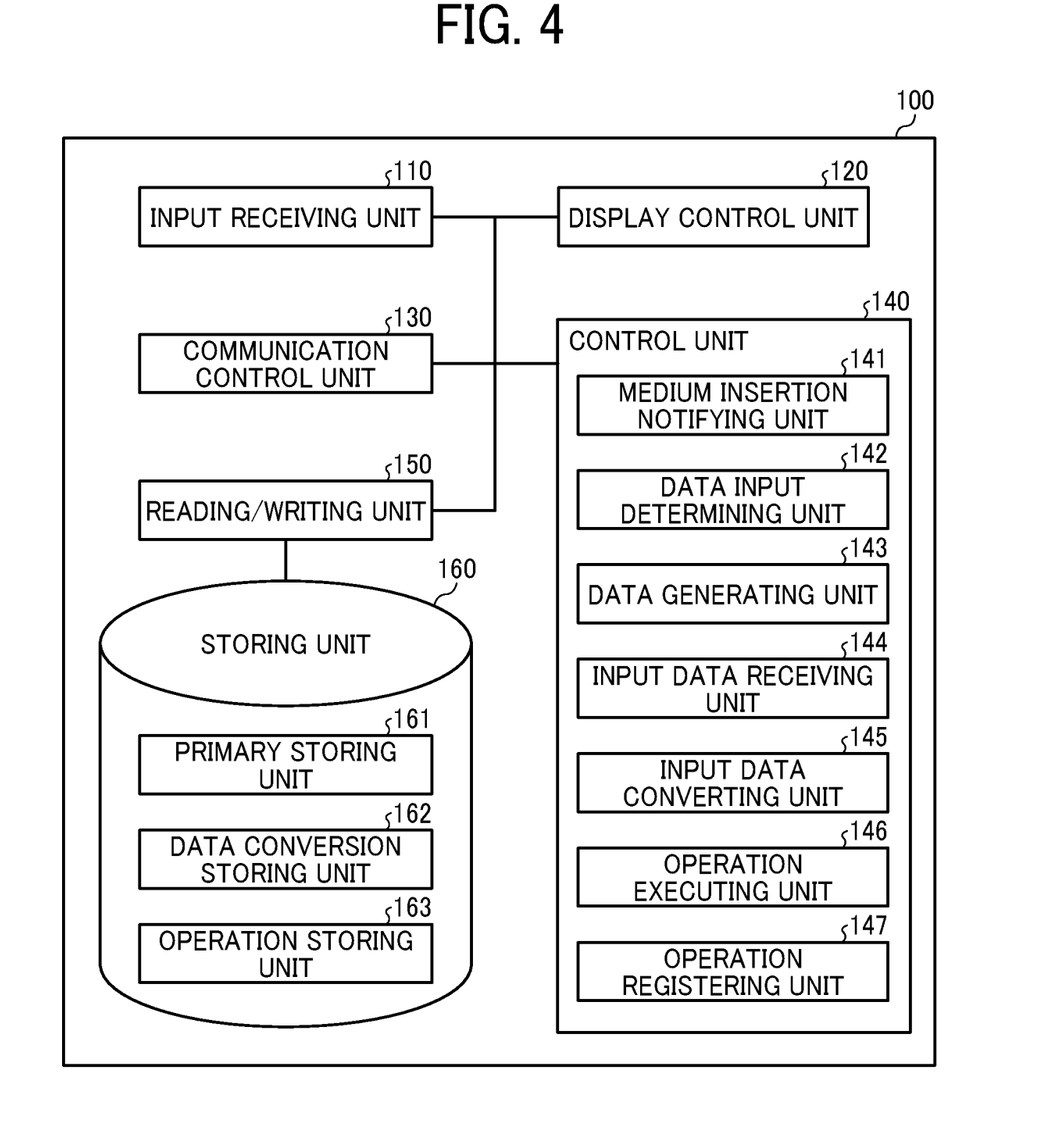
FIG. 4 is a functional block diagram illustrating a functional configuration of the image forming apparatus according to the first embodiment of the present disclosure.

Referring now to FIG. 4, a description is given of a functional configuration of the image forming apparatus 100 described above.

FIG. 4 is a functional block diagram illustrating the functional configuration of the image forming apparatus 100 according to the first embodiment of the present disclosure.

As illustrated in FIG. 4, the image forming apparatus 100 includes an input receiving unit 110, a display control unit 120, communication control unit 130, a control unit 140, a reading/writing unit 150, and a storing unit 160.

The input receiving unit 110 is implemented by the processing of the operation device 60. The input receiving unit 110 displays information that is used for operation to, e.g., a user and receives various inputs from the user. The input receiving unit 110 is also implemented by the processing of the external communication I/F 50. The input receiving unit 110 receives, from an external device, a print instruction or a configuration change request from the user via the LAN or the Internet.

The display control unit 120 is implemented by the CPU 10 executing a program stored in the ROM 20 or the HDD 40 with the RAM 30 as a work area. The display control unit 120 controls a display on a screen of the operation device 60.

The communication control unit 130 is implemented by the processing of the external communication I/F 50. The communication control unit 130 transmits image information to an external device via an e-mail, for example. When settings are available by an external device, the communication control unit 130 communicates with the external device via the network to receive setting information.

The control unit 140 is implemented by the CPU 10 executing a program stored in the ROM 20 or the HDD 40 with the RAM 30 as a work area. The control unit 140 executes functions of the image forming apparatus 100 as a whole.

As illustrated in FIG. 4, the control unit 140 includes, a medium insertion notifying unit 141, a data input determining unit 142, a data generating unit 143, an input data receiving unit 144, an input data converting unit 145, an operation executing unit 146, and an operation registering unit 147. A detailed description thereof is deferred.

The reading/writing unit 150 is implemented by the CPU 10 executing a program stored in the ROM 20 or the HDD 40 with the RAM 30 as a work area. The reading/writing unit 150 stores various types of data in the storing unit 160 on one hand. On the other hand, the reading/writing unit 150 retrieves the various types of data from the storing unit 160.

The storing unit 160 is implemented by the processing of the ROM 20 or the HDD 40. The storing unit 160 stores, e.g., programs, document data, various types of setting information that is used for the operation of the image forming apparatus 100, and operation logs of the image forming apparatus 100. Alternatively, the storing unit 160 may be implemented by a temporary storing function of the RAM 30.

As illustrated in FIG. 4, the storing unit 160 includes, a temporary storing unit 161, a data conversion storing unit 162, and an operation storing unit 163.

The temporary storing unit 161 is implemented by the processing of the RAM 30. The data conversion storing unit 162 and the operation storing unit 163 are implemented by the processing of the ROM 20 or the HDD 40. A detailed description thereof is deferred.

Now, a detailed description is given of the medium insertion notifying unit 141, the data input determining unit 142, the data generating unit 143, the input data receiving unit 144, the input data converting unit 145, the operation executing unit 146, and the operation registering unit 147.

The medium insertion notifying unit 141 detects insertion of the medium 201 into the medium slot 70 and notifies the data input determining unit 142 of the insertion of the medium 201. Incidentally, the medium insertion notifying unit 141 detects removal of the medium 201 from the medium slot 70 and notifies the data input determining unit 142 of the removal of the medium 201.

The data input determining unit 142 determines whether the insertion of the medium 201 notified by the medium insertion notifying unit 141 is an insertion for data input. Hereinafter, the notification of insertion of a medium (e.g., medium 201) may be simply referred to as an insertion notification. Specifically, the data input determining unit 142 determines whether the medium 201 is inserted as a general-purpose medium to write information thereto or read information therefrom, or whether the medium 201 is inserted as a data input medium to input data into the image forming apparatus 100. Then, the data input determining unit 142 notifies the data generating unit 143 of a result of the determination. A detailed description of a way of determining the purpose of insertion of the medium 201 is deferred.

In response to notification from the data input determining unit 142 that the medium 201 is inserted as a data input medium to input data into the image forming apparatus 100, the data generating unit 143 detects the state of the mechanical switch 210 of the medium 201 inserted, so as to generate numerical data according to the state of the mechanical switch 210.

Specifically, in response to the notification from the data input determining unit 142 that the insertion of the medium 201 is for inputting data into the image forming apparatus 100, the data generating unit 143 generates 1-bit data "1" when the mechanical switch 210 as a write protect switch is in the state of "write protect ON". On the other hand, when the mechanical switch 210 is in the state of "write protect OFF", the data generating unit 143 generates 1-bit data "0". The data generating unit 143 transmits the data thus generated to the input data receiving unit 144. Note that, in response to notification from the data input determining unit 142 that the insertion of the medium 201 is not for inputting data, that is the medium 201 is not a data input medium, the data generating unit 143 may not generate the data described above or may not transmit the data generated to the input data receiving unit 144.

The input data receiving unit 144 receives, as input data, the data generated and transmitted by the data generating unit 143. Specifically, the input data receiving unit 144 accumulates the 1-bit data received from the data generating unit 143 up to a given number of bits. In other words, the input data receiving unit 144 receives and accumulates a given number of 1-bit data as a given number of bits of data. Then, the input data receiving unit 144 transmits, as input data, the given number of bits of data to the input data converting unit 145. More specifically, the input data receiving unit 144 stores each pieces of numerical data in the temporary storing unit 161, which functions as a temporary memory including a dynamically secured memory area. When the total amount of the pieces of numerical data thus stored reaches or exceeds the given number of bits, the input data receiving unit 144 transmits, to the input data converting unit 145, the numerical data (i.e., given number of bits of data) accumulated in the temporary storing unit 161. Thereafter, the input data receiving unit 144 frees the secured memory area of the temporary storing unit 161.

The input data converting unit 145 converts the input data into a character string. Specifically, the input data converting unit 145 converts the input data (i.e., given number of bits of data) received from the input data receiving unit 144 into a corresponding character string with reference to the data conversion storing unit 162 described later. As an example, the input data converting unit 145 interprets 8-bit values in hexadecimal and converts the 8-bit values to a character of American Standard Code for Information Interchange (ASCII). Thus, the input data converting unit 145 interprets the input data in hexadecimal for each 8-bit values and converts the input data to a character string of ASCII. Then, the input data converting unit 145 notifies the operation executing unit 146 of the character string. The input data converting unit 145 may notify the operation executing unit 146 of the character string when the character string is stored in association with an operation subjected to execution with reference to the operation storing unit 163.

The operation executing unit 146 executes an operation of the image forming apparatus 100 serving as an information processing apparatus. Specifically, the operation executing unit 146 executes an operation associated with the character string into which the input data is converted. In other words, the operation executing unit 146 executes an operation corresponding to the character string received from the input data converting unit 145. For example, the operation executing unit 146 executes the operation corresponding to the character string with reference to the operation storing unit 163. The character string corresponding to the operation subjected to execution may be referred to as a command for the image forming apparatus 100.

The operation registering unit 147 stores, in the operation storing unit 163, a character string (i.e., command) received by the input receiving unit 110 and a corresponding operation that is executed by the image forming apparatus 100 as a set of information.

Figure 5:
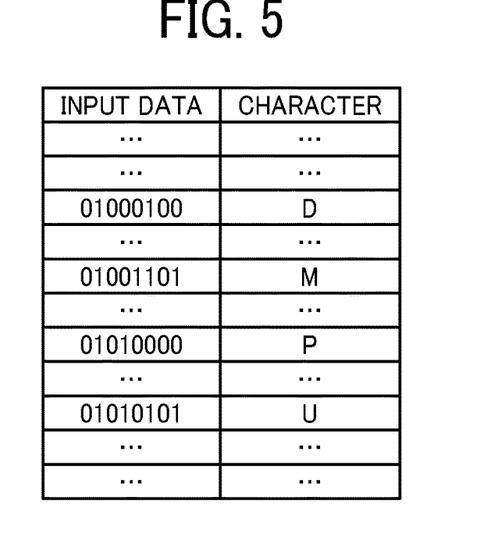
FIG. 5 is a table illustrating a correspondence between input data and characters.

Referring now to FIG. 5, a description is given of a correspondence between input data and characters that construct a character string.

FIG. 5 is a table stored in the data conversion storing unit 162 in advance.

The table of FIG. 5 illustrates the correspondence between input data and characters, specifically, four ASCII characters. As an example of the correspondence between input data and characters, FIG. 5 illustrates input data "01000100" associated with a character "D", input data "01001101" associated with a character "M", input data "01010000" associated with a character "P", and input data "01010101" associated with a character "U". The correspondence stored in the data conversion storing unit 162 is not limited to the example described above. The input data converting unit 145 may refer to any correspondence provided that the input data converting unit 145 converts numerical data received by the input data receiving unit 144 into data representing a predetermined command.

Figure 6:
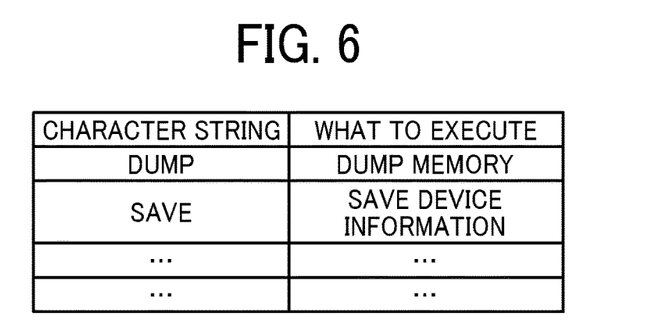
FIG. 6 is a table illustrating a correspondence between character strings and operations subjected to execution by the image forming apparatus.

Referring now to FIG. 6, a description is given of a correspondence between character strings and operation that is executed by the image forming apparatus 100.

FIG. 6 is an operation table stored in the operation storing unit 163 in advance.

The table of FIG. 6 illustrates the correspondence between character strings and operations subjected to execution by the image forming apparatus 100 (i.e., what to execute).

As an example of the correspondence between character strings and operations subjected to execution by the image forming apparatus 100, FIG. 6 illustrates a command or character string "DUMP" associated with an operation "DUMP MEMORY", and a command or character string "SAVE" associated with an operation "SAVE DEVICE INFORMATION".

Figure 7:
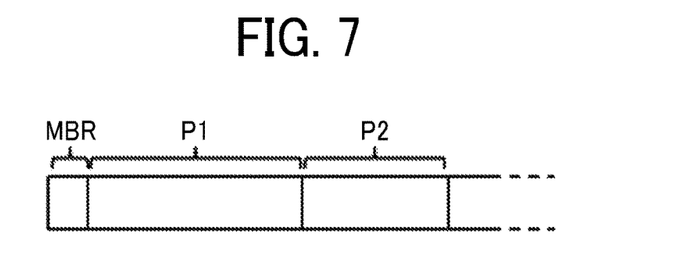
FIG. 7 is a diagram illustrating a memory configuration of the medium according to the first embodiment of the present disclosure.

Referring now to FIG. 7, a description is given of a memory configuration of the medium 201 described above.

FIG. 7 is a diagram illustrating the memory configuration of the medium 201 according to the first embodiment of the present disclosure.

A plurality of different storage areas or partitions is settable in the medium 201 by dividing the capacity of the medium 201. For example, FIG. 7 illustrates two storage areas P1 and P2, and a section called master boot record (MBR). The MBR is a head sector recording information that is used for activation of the medium 201. The MBR is not used for reading or writing by, e.g., a user.

The storage area P1 is in a file allocation table (FAT) format, for example. The storage area P1 is accessible from, e.g., an interface used by a user, the operation device 60 of the image forming apparatus 100, and a user interface of a general-purpose personal computer (PC).

The storage area P2 stores predetermined data based on which the data input determining unit 142 determines that the medium 201 is a data input medium. For example, when the storage area P2 stores data "0x010101010", the data input determining unit 142 determines that the medium 201 is a data input medium. The storage area P2 is an area to which the data input determining unit 142 refers. Unlike the storage area P1, the storage area P2 is inaccessible from a user interface.

Figure 8:
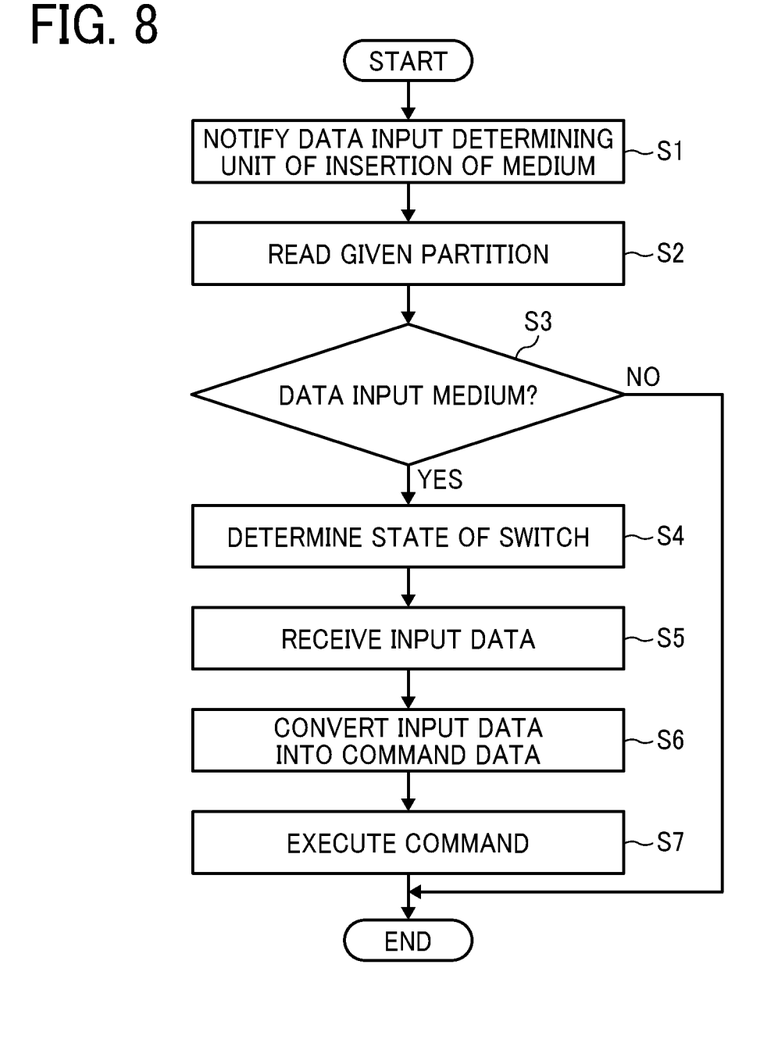
FIG. 8 is a flowchart of a process according to the first embodiment of the present disclosure.

Referring now to FIG. 8, a description is given of a process flow according to the first embodiment of the present disclosure.

FIG. 8 is a flowchart of a process according to the first embodiment of the present disclosure.

The process flow starts when, e.g., a user inserts an SD card (e.g., medium 201), as an example of the storage medium with a mechanical switch, into the image forming apparatus 100.

In step S1, as a step of detecting medium insertion, the medium insertion notifying unit 141 detects the insertion of the SD card into the medium slot 70 and notifies the data input determining unit 142 of the insertion of the SD card.

As a step of determining whether the medium insertion is for inputting data, the data input determining unit 142 reads data from the storage area P2, as a given partition, of the SD card in step S2.

In step S3, the data input determining unit 142 determines whether a given data "0x010101010" exists in the storage area P2. In other words, the data input determining unit 142 determines whether the SD card inserted is a data input medium.

When the given data exists in the storage area P2, that is, when the data input determining unit 142 determines that the SD card inserted is a data input medium (YES in step S3), the data input determining unit 142 notifies the data generating unit 143 that a data input SD card (i.e., data input medium) is inserted. The data input determining unit 142 may also notify the display control unit 120 of the determination. In this case, the display control unit 120 causes the operation device 60 to display a message informing, e.g., a user of a transition of the image forming apparatus 100 to a data input mode.

Thus, the data input determining unit 142 determines, from the SD card (e.g., medium 201) itself, that the SD card inserted is a data input medium. Therefore, insertion of a general-purpose medium does not cause an erroneous transition of the image forming apparatus 100 to the data input mode.

On the other hand, when the storage area P2 does not exist or when the given data does not exist in the storage area P2, that is, when the data input determining unit 142 determines that the SD card inserted is not a data input medium (NO in step S3), the process ends. In this case, based on an instruction from, e.g., a user, information may be read from or written to the storage area P1 of the SD card as a general-purpose medium.

When "YES" in step S3, the process proceeds to step S4.

In step S4, as a step of generating data, the data generating unit 143 detects a state of a write protect switch (e.g., mechanical switch 210) of the SD card. For example, when the write protect switch is in the state of "write protect ON" as illustrated in FIG. 2A, the data generating unit 143 generates numerical data "1". On the other hand, when the write protect switch is in the state of "write protect OFF" as illustrated in FIG. 2B, the data generating unit 143 generates numerical data "0". The data generating unit 143 transmits the data generated, that is, 1-bit numerical data "1" or "0", to the input data receiving unit 144.

In step S5, as a step of receiving and accumulating input data, the input data receiving unit 144 dynamically secures a storage area in the temporary storing unit 161 to temporarily store the numerical data. When an amount of the numerical data temporarily stored and accumulated in the temporary storing unit 161 reaches or exceeds a given amount (e.g., 32 bits), the input data receiving unit 144 transmits, as input data, the multiple bits of numerical data (e.g., 32-bit data) accumulated to the input data converting unit 145. Note that the input data receiving unit 144 frees the storage area secured in the temporary storing unit 161 to be ready for a next input of numerical data.

In step S6, as a step of converting the input data, the input data converting unit 145 interprets the input data in hexadecimal for each 8-bit values, for example, to convert the input data into, e.g., an ASCII character string with reference to the data conversion storing unit 162. For example, when 32-bit data "01000100010101010100110101010000" is input to the image forming apparatus 100 by insertion of the SD card 32 times, the image forming apparatus 100 interprets 8-bit values in hexadecimal to convert the 8-bit values into an ASCII character as illustrated in the table of FIG. 5. As a consequence, the image forming apparatus 100 recognizes the 32-bit input data as a character string "DUMP".

In a case in which the operation storing unit 163 stores an operation associated with the character string resulting from the conversion, the input data converting unit 145 transmits, as a command (i.e., command data), the character string resulting from the conversion to the operation executing unit 146. For example, the character string "DUMP" is associated with the operation "DUMP MEMORY" in the table illustrated in FIG. 6. Therefore, the input data converting unit 145 transmits the character string "DUMP" to the operation executing unit 146.

On the other hand, in a case in which the operation storing unit 163 does not store an operation associated with the character string resulting from the conversion, the input data converting unit 145 may complete the process, for example. Alternatively, the input data converting unit 145 may notify the display control unit 120 that the operation associated with the character string resulting from the conversion is not registered. In this case, the display control unit 120 causes the operation device 60 to display a message informing e.g., a user that the operation or command is unregistered.

In step S7, with reference to the operation storing unit 163, the operation executing unit 146 executes the operation associated with the character string (i.e., command) received from the input data converting unit 145. For example, the operation executing unit 146 executes the operation "DUMP MEMORY" associated with the character string (i.e., command) "DUMP".

As described above, each time the medium 201 is inserted into the image forming apparatus 100 by, e.g., a user, the image forming apparatus 100 recognizes 1-bit data corresponding to the state of the mechanical switch 210 of the medium 201. By insertion of the medium 201 N times, an N-bit data pattern is input into the image forming apparatus 100. Such a configuration obviates the need to provide a dedicated user interface to the image forming apparatus 100, allowing the user to cause the image forming apparatus 100 to execute a desired operation.

In order to cause a computer without a user interface (e.g., keyboard) to execute an operation desired by a user, some typical image forming apparatuses may monitor, during execution of a computer program, an ON/OFF state of a write protect switch of a medium so as to process a conditional branch in the computer program according to the ON/OFF state of the write protect switch.

However, in such typical information processing apparatuses, an operation within a range of a conditional branch in a program is limited to an operation that is executable by a correct execution of the program stored in the medium. Such a limitation hampers various operation instructions.

According to the present embodiment, an external device or a removable medium is used as a user interface as described above. Therefore, the user can instruct the image forming apparatus 100 to execute a desired operation even though the image forming apparatus 100 does not have a dedicated user interface, such as a switch, aboard.

For example, when implementing a function that is an optional user request specification, such as a transition to a debug mode, the behavior of the image forming apparatus 100 is arbitrarily changed without dedicated parts. Even when the image forming apparatus 100 is in an error state, a desired operation is executable by the image forming apparatus 100 provided that the image forming apparatus 100 can recognize a medium with a mechanical switch.

Figure 9:
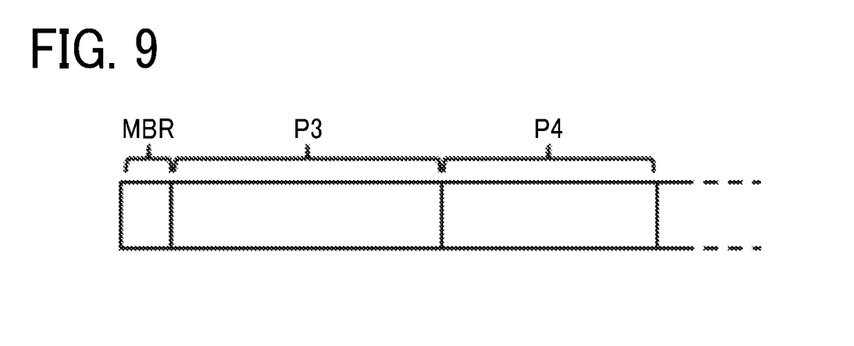
FIG. 9 is a diagram illustrating a memory configuration of a medium according to a second embodiment of the present disclosure.
Figure 10:
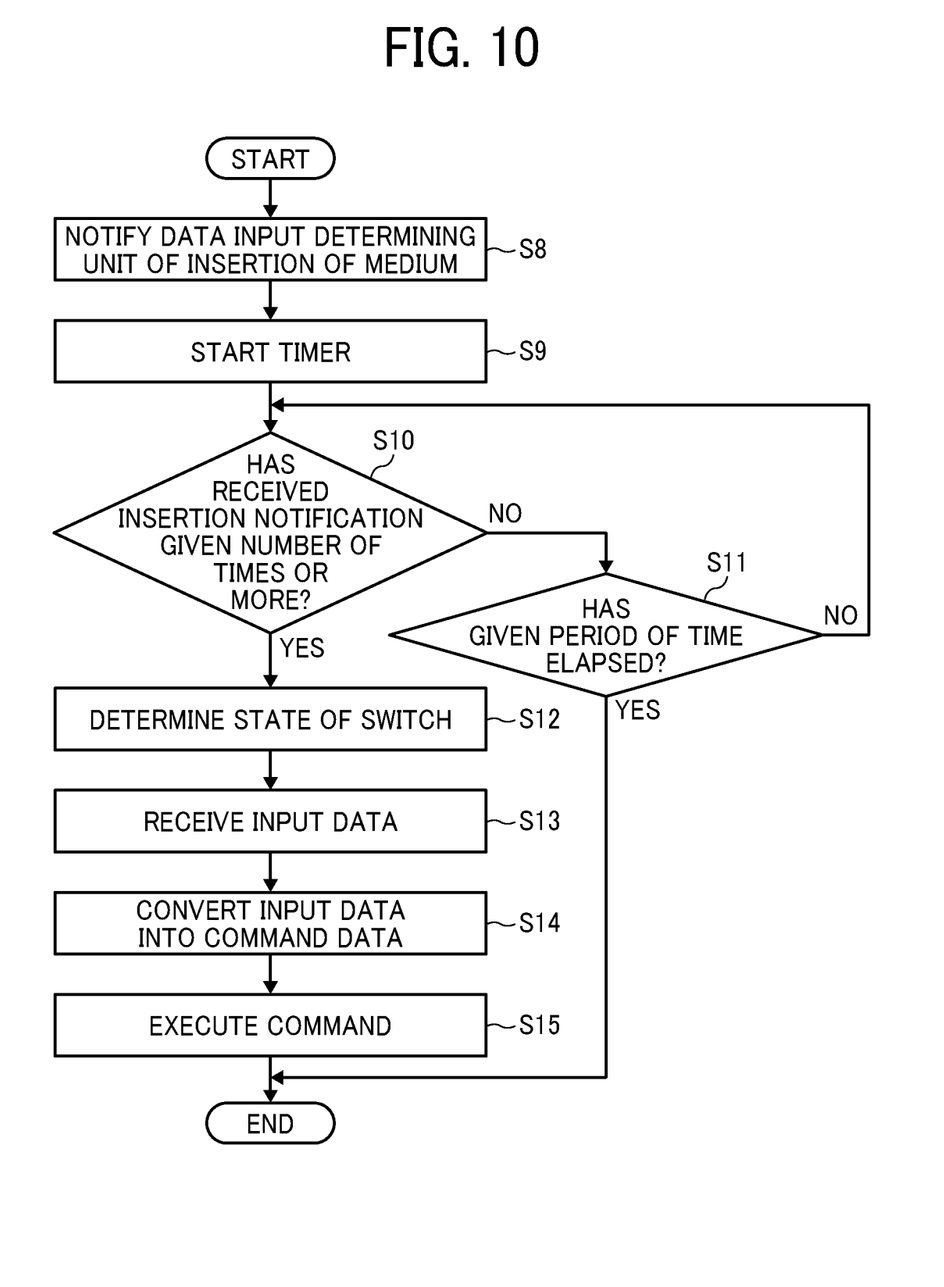
FIG. 10 is a flowchart of a process according to the second embodiment of the present disclosure.

Referring now to FIGS. 9 and 10, a description is given of the second embodiment of the present disclosure.

The medium 202 of the second embodiment has a different memory configuration from the memory configuration of the medium 201 of the first embodiment illustrated in FIG. 7. In addition, a process flow of the second embodiment is different from the process flow of the first embodiment illustrated in FIG. 8. Any description of the second embodiment redundant with the above-description of the first embodiment is herein omitted unless otherwise required.

FIG. 9 is a diagram illustrating the memory configuration of the medium 202 according to the second embodiment of the present disclosure.

The medium 202 is a storage medium such as an SD card. A plurality of different storage areas or partitions is settable in the medium 202 by dividing the capacity of the medium 202. For example, FIG. 9 illustrates two storage areas P3 and P4, and a section called MBR. The MBR is a head sector recording information that is used for activation of the medium 202. The MBR is not used for reading or writing by, e.g., a user.

The storage areas P3 and P4 are in an FAT format, for example. The storage areas P3 and P4 are accessible from, e.g., an interface used by a user, the operation device 60 of the image forming apparatus 100, and a user interface of a general-purpose PC.

Unlike the medium 201 of the first embodiment illustrated in FIG. 7, the medium 202 of the second embodiment does not have the storage area P2 that stores data indicating a data input medium. That is, unlike the medium 201 of the first embodiment serving as a storage medium and a data input medium, the medium 202 of the second embodiment is a general-purpose memory.

Alternatively, the medium 201 and the medium 202 may have identical memory configurations, provided that the medium 202 is not used for data input. That is, the medium 202 may have the storage area P2 storing data other than the data "0x01010101", because the data "0x01010101" indicates that the medium 202 is a data input medium.

Referring now to FIG. 10, a description is given of the process flow according to the second embodiment of the present disclosure.

FIG. 10 is a flowchart of a process according to the second embodiment of the present disclosure.

The process flow starts when, e.g., a user inserts an SD card (e.g., medium 202), as an example of the storage medium with a mechanical switch, into the image forming apparatus 100. In the present process flow, the data input determining unit 142 determines a purpose of medium insertion, based on whether the medium insertion is detected a given number of times within a given period of time.

Specifically, in step S8, as a step of detecting medium insertion, the medium insertion notifying unit 141 detects the insertion of the SD card into the medium slot 70 and notifies the data input determining unit 142 of the insertion of the SD card.

In step S9, in response to a first insertion notification, the data input determining unit 142 starts a timer to count or measure a given period of time (e.g., 3 seconds).

In step S10, the data input determining unit 142 counts the insertion notification in number and determines whether the data input determining unit 142 has received the insertion notification a given number of times (e.g., 10 times) or more.

When the data input determining unit 142 has received the insertion notification the given number of times (e.g., 10 times) or more (YES in step S10), the data input determining unit 142 determines that the SD card is inserted to input data into the image forming apparatus 100 with respect to the subsequent insertion notification. In other words, when the insertion notification counted in number is not less than a given value, the data input determining unit 142 determines that subsequent insertion of the SD card is for inputting data into the image forming apparatus 100. Then, the data input determining unit 142 notifies the data generating unit 143 of the determination. That is, the process proceeds to step S12. The data input determining unit 142 may also notify the display control unit 120 of the determination. In this case, the display control unit 120 causes the operation device 60 to display a message informing, e.g., a user of a transition of the image forming apparatus 100 to the data input mode.

On the other hand, when the data input determining unit 142 has not received the insertion notification the given number of times or more (NO in step S10), the data input determining unit 142 determines whether the given period of time measured by the timer has elapsed in step S11.

When the data input determining unit 142 determines that the given period of time measured by the timer has elapsed (YES in step S11), the process ends. On the other hand, when the data input determining unit 142 determines that the given period of time measured by the timer has not elapsed (NO in step S11), the process returns to step S10.

Thus, when the data input determining unit 142 detects a predetermined medium insertion by, e.g., a user, the data input determining unit 142 determines that the SD card is inserted to input data into the image forming apparatus 100 with respect to the subsequent insertion notification. For example, when the data input determining unit 142 detects insertion of the SD card 10 times or more for 3 seconds, the data input determining unit 142 determines that the SD card is inserted to input data into the image forming apparatus 100 with respect to the subsequent insertion notification. Specifically, for example, with reference to the predetermined medium insertion stored in the storing unit 160 in advance, the data input determining unit 142 determines whether the SD card is inserted to input data into the image forming apparatus 100. The predetermined medium insertion according to the present process flow is medium insertion the given number of times or more within the given period of time, with or without regard for the state of the mechanical switch 210.

Thus, the second embodiment provides substantially the same advantages as the advantages provided by the first embodiment, without preparing a specific-purpose medium (i.e., data input medium) as in the first embodiment.

Referring back to FIG. 10, in response to notification from the data input determining unit 142 that the SD card is inserted to input data into the image forming apparatus 100, the data generating unit 143 detects a state of a write protect switch (e.g., mechanical switch 210) of the SD card, as a step of generating data, in step S12. For example, when the write protect switch is in the state of "write protect ON" as illustrated in FIG. 2A, the data generating unit 143 generates numerical data "1". On the other hand, when the write protect switch is in the state of "write protect OFF" as illustrated in FIG. 2B, the data generating unit 143 generates numerical data "0". The data generating unit 143 transmits the data generated, that is, 1-bit numerical data "1" or "0", to the input data receiving unit 144.

In step S13, as a step of receiving and accumulating input data, the input data receiving unit 144 dynamically secures a storage area in the temporary storing unit 161 to temporarily store the numerical data. When an amount of the numerical data temporarily stored and accumulated in the temporary storing unit 161 reaches or exceeds a given amount (e.g., 32 bits), the input data receiving unit 144 transmits, as input data, the multiple bits of numerical data (e.g., 32-bit data) accumulated to the input data converting unit 145.

Note that the input data receiving unit 144 frees the storage area secured in the temporary storing unit 161 to be ready for a next input of numerical data.

In step S14, as a step of converting the input data, the input data converting unit 145 interprets the input data in hexadecimal for each 8-bit values, for example, to convert the input data into, e.g., an ASCII character string with reference to the data conversion storing unit 162. For example, when 32-bit data "01000100010101010100110101010000" is input to the image forming apparatus 100 by insertion of the SD card 32 times, the image forming apparatus 100 interprets 8-bit values in hexadecimal to convert the 8-bit values into an ASCII character as illustrated in the table of FIG. 5. As a consequence, the image forming apparatus 100 recognizes the 32-bit input data as a character string "DUMP".

In a case in which the operation storing unit 163 stores an operation associated with the character string resulting from the conversion, the input data converting unit 145 transmits, as a command (i.e., command data), the character string resulting from the conversion to the operation executing unit 146.

For example, the character string "DUMP" is associated with the operation "DUMP MEMORY" in the table illustrated in FIG. 6. Therefore, the input data converting unit 145 transmits the character string "DUMP" to the operation executing unit 146.

On the other hand, in a case in which the operation storing unit 163 does not store an operation associated with the character string resulting from the conversion, the input data converting unit 145 may complete the process, for example. Alternatively, the input data converting unit 145 may notify the display control unit 120 that the operation associated with the character string resulting from the conversion is not registered. In this case, the display control unit 120 causes the operation device 60 to display a message informing e.g., a user that the operation or command is unregistered.

In step S15, with reference to the operation storing unit 163, the operation executing unit 146 executes the operation associated with the character string (i.e., command) received from the input data converting unit 145.

For example, the operation executing unit 146 executes the operation "DUMP MEMORY" associated with the character string (i.e., command) "DUMP".

In the flow described above, when receiving the insertion notification the given number of times for the given period of time, the data input determining unit 142 determines that the data input is the purpose of medium insertion. That is, the criterion for the determination is receiving the insertion notification the given number of times for the given period of time. Alternatively, in response to detection of multiple sets of insertion and removal of the SD card in a predetermined order with different predetermined periods of insertion-to-removal time measured, the data input determining unit 142 may determine that the SD card is inserted to input data into the image forming apparatus 100 with respect to the subsequent insertion notification.

Specifically, the data input determining unit 142 measures the insertion-to-removal time, which is a period of time from when receiving an insertion notification until when receiving a removal notification from the medium insertion notifying unit 141. When the data input determining unit 142 is notified, in the given order, of multiple sets of insertion and removal of the SD card with different periods of the insertion-to-removal time, the data input determining unit 142 determines that the SD card is inserted to input data into the image forming apparatus 100 with respect to the subsequent insertion notification.

For example, in response to detection of three sets of insertion and removal of the SD card for 5 seconds, 3 seconds, and 2 seconds, respectively, in this order, the data input determining unit 142 determines that the SD card is inserted to input data into the image forming apparatus 100 with respect to the subsequent insertion notification. Note that each of the 5 seconds, 3 seconds, and 2 seconds is the insertion-to-removal time from insertion of the SD card to removal of the SD card.

The criterion for determination is not limited to the examples described above. Based on another criterion for determination, the data input determining unit 142 may determine that the SD card is inserted to input data into the image forming apparatus 100.

As described above, the second embodiment provides substantially the same advantages as the advantages provided by the first embodiment, with the medium 202 as a general-purpose medium instead of the medium 201 as a specific-purpose (i.e., data input) medium.

In the second embodiment, the data input determining unit 142 may monitor the insertion notification even after the image forming apparatus 100 enters the data input mode.

Specifically, even after determining that the insertion of the SD card is for inputting data into the image forming apparatus 100, the data input determining unit 142 continues to count the insertion notification in number within a given period of time. When the insertion notification counted reaches or exceeds a given number, the data input determining unit 142 determines that the insertion of the SD card is not for inputting data into the image forming apparatus 100 with respect to the subsequent insertion notification. Then, the data input determining unit 142 notifies the data generating unit 143 of the determination. As a consequence, the data input from the inserted SD card (e.g., medium 202) is completed.

Alternatively, even after determining that the insertion of the SD card is for inputting data into the image forming apparatus 100, the data input determining unit 142 may continue to measure the insertion-to-removal time. In this case, when continuously detecting a given number of sets of insertion and removal of the SD card at given time intervals, the data input determining unit 142 determines that the insertion of the SD card is not for inputting data into the image forming apparatus 100 with respect to the subsequent insertion notification. Then, the data input determining unit 142 notifies the data generating unit 143 of the determination. As a consequence, the data input from the inserted SD card (e.g., medium 202) is completed.

Thus, e.g., a user acts given insertion and removal of the medium 202, from which data is input when the medium 202 is inserted. Accordingly, the user completes the data input at a desired timing. In addition, the medium 202 is available as a general-purpose storage medium.

Alternatively, in the second embodiment, the data input determining unit 142 may retain a previous medium insertion time. Note that the previous medium insertion time is a time when the SD card is previously inserted to input data into the image forming apparatus 100. In this case, when a given period of time has elapsed from the previous medium insertion time, the data input determining unit 142 determines that the insertion of the SD card is not for inputting data into the image forming apparatus 100 with respect to the subsequent insertion notification. Then, the data input determining unit 142 notifies the data generating unit 143 of the determination. As a consequence, the data input from the inserted SD card (e.g., medium 202) is completed.

Thus, when a given period of time has elapsed after data input from the medium 202 inserted, the image forming apparatus 100 is changed to a non-acceptance mode so as not to accept data input from the medium 202 inserted. Accordingly, even when the operation is completed in the data input mode in which the image forming apparatus 100 accepts data input from the medium 202 inserted, a newly inserted medium 202 is used as a general-purpose medium, thereby preventing unintended data input.

The data input determining unit 142 according to the first and second embodiments may further have the following function.

That is, when the image forming apparatus 100 serving as an information processing apparatus does not accept an operation through, e.g., the operation device 60, the data input determining unit 142 may determine that the insertion of the SD card is for inputting data into the image forming apparatus 100 in response to the insertion notification.

Specifically, for example, when the operation device 60 is disconnected from the image forming apparatus 100 or when the operation device 60 completely stops and does not accept any operation, the image forming apparatus 100 is changed to the data input mode in response to detection of insertion of the medium 201 or medium 202, so as to accept data input therefrom. In short, the image forming apparatus 100 malfunctions, data is promptly input into the image forming apparatus 100 from the medium 201 or the medium 202 inserted.

In addition, the image forming apparatus 100 may include a first program for detecting hardware and a second program for enabling the medium to interrupt the first program when an error occurs in the first program.

In other words, when hardware detection is unstable due to an operation error of a kernel (i.e., first program) of an OS executed in the image forming apparatus 100 (i.e., information processing apparatus), an error handler (i.e., second program) enables the medium to interrupt the first program with the medium slot 70. Such a configuration assures data input from the medium 201 or the medium 202 inserted.

The input data receiving unit 144 according to the first and second embodiments may further have the following function.

That is, the input data receiving unit 144 may retain a previous medium insertion time. Note that the previous medium insertion time is a time when the medium 201 is previously inserted to input data into the image forming apparatus 100. Upon current insertion of the medium 201 to input data into the image forming apparatus 100, the input data receiving unit 144 calculates a time difference between the previous medium insertion time and a current medium insertion time. Note that the current medium insertion time is a time when the medium 201 is currently inserted to input data into the image forming apparatus 100. When the time difference is not smaller than a given difference (e.g., 10 seconds), the input data receiving unit 144 deletes the numerical data temporarily stored in the temporary storing unit 161.

Such a configuration clears erroneous input data, allowing the image forming apparatus 100 to receive data input again. For example, when a user erroneously inserts the medium 201 and unintended data (e.g., unintended numerical data) is input into the image forming apparatus 100, the user removes the medium 201 from the medium slot 70 and waits for a certain period of time, so that the image forming apparatus 100 clears the unintended data to be ready for next data input.

The input data receiving unit 144 according to the first and second embodiments may further have the following function.

That is, when receiving and accumulating identical pieces of numerical data a predetermined number of times (e.g., 20 times) or more, the input data receiving unit 144 deletes the numerical data temporarily stored in the temporary storing unit 161. In other words, when receiving and accumulating not less than a predetermined number of identical pieces of numerical data (e.g., 20 or more identical pieces of numerical data), the input data receiving unit 144 deletes the numerical data temporarily stored in the temporary storing unit 161.

Such a configuration clears erroneous input data, allowing the image forming apparatus 100 to receive data input again. For example, when a user erroneously inserts the medium 201 and unintended data (e.g., unintended numerical data) is input into the image forming apparatus 100, the user inserts and removes the medium 201 in and from the medium slot 70 with the mechanical switch 210 located at the same position, so that the image forming apparatus 100 clears the unintended data to be ready for next data input.

According to the embodiments of the present disclosure, a user instructs an information processing apparatus, without a specific user interface, to perform various operations.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An information processing apparatus comprising:
    an interface for a medium, the medium including a mechanical switch; and circuitry configured to:
    detect insertion of the medium into the interface;
    determine whether the insertion of the medium is for inputting data into the information processing apparatus;
    detect a state of the mechanical switch of the medium inserted, in response to determination that the insertion of the medium is for inputting data;
    generate numerical data according to the state;
    receive, as input data, the numerical data generated; and
    execute an operation according to the input data.

2. The information processing apparatus according to claim 1,
    wherein the circuitry is configured to read data stored in a storage area of the medium and determine whether the insertion of the medium is for inputting data, according to the data read.

3. The information processing apparatus according to claim 1,
    wherein the circuitry is configured to count the insertion in number within a given period of time, and
    wherein, in response to the insertion counted in number being not less than a given value, the circuitry is configured to determine that subsequent insertion of the medium is for inputting data.

4. The information processing apparatus according to claim 3,
    wherein the circuitry is further configured to count the insertion in number within another given period of time after determining that the subsequent insertion of the medium is for inputting data, and
    wherein, in response to the insertion counted in number being not less than another given value, the circuitry is configured to determine that further subsequent insertion of the medium is not for inputting data and not to detect the state of the mechanical switch.

5. The information processing apparatus according to claim 1,
    wherein the circuitry is further configured to detect removal of the medium from the interface.

6. The information processing apparatus according to claim 5,
    wherein the circuitry is configured to measure an insertion-to-removal time from the insertion of the medium detected to the removal of the medium detected, and
    wherein, in response to detection of a plurality of sets of the insertion of the medium and the removal of the medium in a given order with different periods of the insertion-to-removal time, the circuitry is configured to determine that subsequent insertion of the medium is for inputting data.

7. The information processing apparatus according to claim 6,
    wherein the circuitry is further configured to measure the insertion-to-removal time after determining that the subsequent insertion of the medium is for inputting data, and
    wherein, in response to continuous detection of a given number of sets of the insertion of the medium and the removal of the medium at given time intervals, the circuitry is configured to determine that further subsequent insertion of the medium is not for inputting data and not to detect the state of the mechanical switch.

8. The information processing apparatus according to claim 1,
    wherein the circuitry is configured to retain a previous medium insertion time that is a time when the medium is previously inserted to input data, and
    wherein, in response to an elapse of a given period of time from the previous medium insertion time, the circuitry is configured to determine that subsequent insertion of the medium is not for inputting data and not to detect the state of the mechanical switch.

9. The information processing apparatus according to claim 1, further comprising an operation device,
    wherein, in a state in which an operation is unacceptable through the operation device, the circuitry is configured to determine that the insertion of the medium is for inputting data.

10. The information processing apparatus according to claim 1,
    wherein the circuitry is further configured to:
    detect hardware connected to the information processing apparatus; and
    enable the medium to interrupt an unstable detection of the hardware.

11. The information processing apparatus according to claim 1, further comprising a memory,
    wherein the circuitry is configured to store, in the memory, an operation table associating a character string with an operation subjected to execution, and
    wherein the circuitry is configured to execute the operation associated with the character string with reference to the operation table.

12. The information processing apparatus according to claim 1, further comprising a temporary memory,
    wherein the circuitry is configured to temporarily store the numerical data in the temporary memory and accumulate, as the input data, a given number of pieces of the numerical data.

13. The information processing apparatus according to claim 12,
    wherein the circuitry is configured to retain a previous medium insertion time that is a time when the medium is previously inserted to input data,
    wherein the circuitry is configured to calculate a time difference between the previous medium insertion time and a current medium insertion time that is a time when the medium is currently inserted to input data, and wherein, in response to the time difference being not smaller than a given difference, the circuitry is configured to delete the numerical data stored in the temporary memory.

14. The information processing apparatus according to claim 12,
wherein, in response to accumulation of not less than a given number of identical pieces of the numerical data, the circuitry is configured to delete the numerical data stored in the temporary memory.

15. The information processing apparatus according to claim 1,
wherein the circuitry is further configured to convert the input data into a character string, and
wherein the circuitry is configured to execute the operation associated with the character string.

16. The information processing apparatus according to claim 1,
wherein the interface is a medium slot.

17. An image forming apparatus comprising:
an interface for a medium, the medium including a mechanical switch; and
circuitry configured to:
    detect insertion of the medium into the interface;
    determine whether the insertion of the medium is for inputting data into the image forming apparatus;
    detect a state of the mechanical switch of the medium inserted, in response to determination that the insertion of the medium is for inputting data;
    generate numerical data according to the state;
    receive, as input data, the numerical data generated; and
    execute an operation according to the input data.

18. The image forming apparatus according to claim 17, wherein the interface is a medium slot.

19. The image forming apparatus according to claim 17, wherein the circuitry is further configured to detect removal of the medium from the interface.

* * * * *